United States Patent
Zimmermann

(10) Patent No.: US 11,453,287 B2
(45) Date of Patent: Sep. 27, 2022

(54) METHOD FOR DETERMINING CLUTCH PARAMETERS OF AN AUTOMATIC TRANSMISSION HAVING AT LEAST ONE CLUTCH

(71) Applicant: VOLKSWAGEN AKTIENGESELLSCHAFT, Wolfsburg (DE)

(72) Inventor: Jannis Zimmermann, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 269 days.

(21) Appl. No.: 16/764,934

(22) PCT Filed: Oct. 29, 2018

(86) PCT No.: PCT/EP2018/079603
§ 371 (c)(1),
(2) Date: May 18, 2020

(87) PCT Pub. No.: WO2019/096573
PCT Pub. Date: May 23, 2019

(65) Prior Publication Data
US 2020/0346536 A1 Nov. 5, 2020

(30) Foreign Application Priority Data
Nov. 17, 2017 (DE) .......................... 102017220577.6

(51) Int. Cl.
*B60K 6/547* (2007.10)
*B60K 6/383* (2007.10)
*F16H 3/08* (2006.01)

(52) U.S. Cl.
CPC .............. *B60K 6/383* (2013.01); *B60K 6/547* (2013.01); *F16H 3/08* (2013.01); *B60W 2510/0241* (2013.01)

(58) Field of Classification Search
CPC .......... B60K 6/383; B60K 6/547; B60K 6/48; B60K 2006/4825; B60K 2006/541;
(Continued)

(56) References Cited

U.S. PATENT DOCUMENTS 7,850,570 B2 * 12/2010 Jager ....................... F16D 48/06
477/80
8,577,573 B2 11/2013 Blessing et al.
(Continued)

FOREIGN PATENT DOCUMENTS

DE 102010046138 A1 3/2012
DE 102011108013 A1 1/2013
(Continued)

*Primary Examiner* — David J Hlavka
(74) *Attorney, Agent, or Firm* — Laurence A. Greenberg; Werner H. Stemer; Ralph E. Locher

(57) ABSTRACT

A method for determining transmission and/or clutch parameters of a motor vehicle automatic transmission having at least one clutch, in particular for basic calibration of the transmission, in particular an automated manual transmission and/or a dual-clutch transmission, includes determining drag torque and/or kiss point of the clutch using an actuable synchronization device. The clutch has at least one drive side connected to an internal combustion engine output shaft and at least one output side connected to a transmission input shaft. The transmission output and/or drive shaft is blocked. The drive side of the clutch is driven. Basic calibration of the transmission is improved by driving the drive side of the clutch by an electric motor, providing a freewheel-shifted gear stage, and driving the drive side of the clutch by the
(Continued)

electric motor in a rotation direction opposite the internal combustion engine output shaft.

10 Claims, 2 Drawing Sheets

(58) Field of Classification Search
CPC ... F16H 3/08; F16H 3/10; F16H 3/006; F16H 2003/0931; F16H 2200/0056; B60W 2510/0241; B60W 2510/1015; B60W 2710/081; B60W 2710/10
See application file for complete search history.

(56) References Cited

U.S. PATENT DOCUMENTS

| | | | |
|---|---|---|---|
| 9,410,602 | B2 | 8/2016 | Dewitz |
| 2012/0196722 | A1* | 8/2012 | Preisner ............... B60W 10/06 477/166 |
| 2018/0170359 | A1* | 6/2018 | Kim ................ B60W 50/0098 |

FOREIGN PATENT DOCUMENTS

| | | |
|---|---|---|
| DE | 10308517 B4 | 2/2015 |
| DE | 102015220059 A1 | 4/2016 |
| DE | 102016110783 A1 | 12/2017 |
| EP | 2325512 A2 | 5/2011 |
| EP | 2100050 B1 | 8/2011 |

* cited by examiner

METHOD FOR DETERMINING CLUTCH PARAMETERS OF AN AUTOMATIC TRANSMISSION HAVING AT LEAST ONE CLUTCH

BACKGROUND OF THE INVENTION

Field of the Invention

The invention relates to a method for determining transmission and/or clutch parameters of an automatic transmission having at least one clutch, in particular for basic calibration of the automatic transmission, in particular of an automated manual transmission and/or a dual clutch transmission wherein the drag torque and/or the kiss point of the clutch is determined with the aid of at least one actuable synchronization device, wherein the clutch has at least one drive side which can be actively connected and/or is actively connected to an internal combustion engine output shaft and at least one output side which is actively connected to at least one transmission input shaft, and wherein the transmission output shaft and/or the drive shaft(s) of the transmission are blocked, and wherein the drive side of the clutch is driven.

Various transmissions are known in the prior art, in particular automatic transmissions are known which have at least one clutch, in particular a friction clutch, and can be formed in various ways. In particular such automatic transmissions having at least one clutch are then formed as automated manual transmissions and/or as dual clutch transmissions, in particular as automated dual clutch transmissions.

The drivetrains of corresponding motor vehicles are at least partially prefabricated and then correspondingly actively connected to the body of the motor vehicle, in particular in the case of what is known as the "marriage", or correspondingly coupled to one another. In particular in advance, however, the transmission and/or clutch parameters of the respective drivetrain are basically "calibrated" by what is known as a "basic calibration". Or in other words: for basic calibration of the automatic transmission, the automatic transmission having in each case at least one clutch (and/or further corresponding components of the drivetrain) is positioned on what is known as an "EOL test bench" so that the respective components can be correspondingly adjusted and/or adapted there so that the different manufacturing tolerances which arise in particular during manufacture then no longer have any influence on the control/actuation of the automatic transmission and/or on the control/actuation of the clutch.

During what is known as "basic calibration" of an automatic transmission, in particular the drag torque and/or the kiss point of the clutch are then determined with the aid of at least one actuable synchronization device. The clutch of the automatic transmission has at least one drive side which can be actively connected and/or is actively connected to an internal combustion engine output shaft, in particular the drive side of the clutch can be actively connected via what is known as the "C0 clutch" to an internal combustion engine output shaft. The clutch furthermore has at least one output side which is actively connected to at least one transmission input shaft. The clutch is formed in particular as a wet friction clutch and/or multiple disk clutch, wherein the transmission output shaft and/or—depending on the respective specifically formed automatic transmission—the drive shaft or also the drive shafts of the transmission are then blocked in particular on the EOL test bench, in particular the parking lock of the automatic transmission is engaged, but the drive side of the clutch can be driven or is driven.

In the prior art from which the invention proceeds (DE 103 08 517 B4), a method for determining transmission and/or clutch parameters of an automatic transmission having at least one clutch and being formed as a dual clutch transmission is known, wherein, on the EOL test bench, the drive side of a clutch is actively driven by the internal combustion engine output shaft and then the parameters of this respective clutch assigned to the freewheeling transmission input shaft and/or an actuable synchronization device are determined in a specific manner. The basic calibration of this drivetrain positioned on the in the case of the EOL test bench or automatic transmission positioned there (dual clutch transmission) is therefore performed with the internal combustion engine running and a freewheeling transmission input shaft then driven via the respective driven clutch, wherein the transmission input shaft therefore can in particular initially "free wheel" because all of the synchronization devices assigned to this respective transmission input shaft are initially switched into the neutral position. In the case of the method described here, the drag torque of the clutch or the kiss point is then determined in a very specific manner or a clutch characteristic line adaptation is carried out.

A further method for the adaptation of the characteristic line of a clutch is furthermore described or disclosed in the prior art, namely in EP 2 100 050 B1. In this case, this method is, however, only carried out if a defined change in the transmission input shaft rotational speed is carried out, namely if the transmission input shaft rotational speed exceeds a predefined threshold value in specific conditions.

The methods known in the prior art are, however, not yet optimally formed, in particular a basic calibration of an automatic transmission on an EOL test bench is above all problematic. For example, specifically formed automatic transmissions are also known, wherein in the case of such specifically formed automatic transmissions, a gear stage, in particular the first gear stage, is assigned a freewheel or this corresponding gear stage is "freewheel-shifted" with the aid of a freewheel. Here, the freewheel overtakes/opens if the ratchet wheel rotational speed (driveshaft rotational speed by transmission of this gear stage) is lower than the rotational speed of the corresponding transmission output shaft/drive shaft. If a drive torque is present at the ratchet wheel with the same rotational speed as the transmission output shaft rotational speed/drive shaft rotational speed, the freewheel closes. The freewheel then transmits the torque, ratchet wheel and transmission output shaft/drive shaft are synchronized. An automatic transmission formed in such a manner, as described above, cannot be calibrated on an EOL test bench since the transmission output shafts and/or the drive shafts of the automatic transmission formed in such a manner are then blocked, in particular the parking lock is then engaged, and the freewheel mentioned above is then necessarily closed since the transmission output shaft or the respective drive shaft is stationary (and thus the ratchet wheel cannot rotate more slowly). A corresponding basic calibration of the automatic transmission with a freewheel-shifted gear stage described above is therefore not possible with the normal methods. Moreover, from an environmental perspective, it is problematic in particular in the case of the basic calibrations performed on EOL test benches that the internal combustion engine is running and, on one hand, fuel is consumed and, on the other hand, exhaust gasses are generated. From the perspective of fuel consumption and exhaust gas generation, the basic calibrations of the automatic transmissions known in the prior art are therefore also not yet optimally formed.

SUMMARY OF THE INVENTION

The object on which the invention is based is therefore to configure and further develop the above-mentioned method such that, on one hand, the method is improved from an environmental perspective, and on the other hand, the basic calibration of an automatic transmission having in particular a freewheel-shifted gear stage on an EOL test bench is enabled.

The object highlighted above is thus achieved by the steps described below.

The drive side of the clutch is driven with the aid of an electric motor, wherein at least one freewheel-shifted gear stage is present and wherein the drive side of the clutch is driven in a direction of rotation of the electric motor opposite to the direction of rotation of the internal combustion engine output shaft. As a result of this, it is initially achieved that the basic calibration of an automatic transmission formed in such a manner can be performed in particular on an EOL test bench, namely the basic calibration of the automatic transmission is carried out in an opposite direction of rotation (counter to the direction of rotation of the internal combustion engine), namely the drive side of the clutch is driven with the aid of the electric motor in an opposite direction to the direction of rotation of the internal combustion engine. In this case, the freewheel then also opens so that a rotation of the transmission input shaft of the automatic transmission is enabled although the transmission output shaft and/or the drive shaft(s) are stationary or blocked in particular also in the case of an engaged parking lock or a vehicle on the EOL test bench. The basic calibration of the automatic transmission or the determination of the transmission and/or clutch parameters is therefore carried out in the case of a direction of rotation opposite to the direction of rotation of the internal combustion engine or the internal combustion engine output shaft. In the event that the drivetrain is formed as a hybrid drivetrain, in particular the motor vehicle is formed as a hybrid vehicle, the drive side of the clutch can be driven with the aid of the electric motor of the drivetrain. In particular if the motor vehicle is not formed as a hybrid vehicle, the drive side of the clutch can then be driven by an externally present electric motor.

A plurality of possibilities are thus realized; in particular, however, the above-mentioned disadvantages are avoided.

The method according to the invention will now be performed in particular in the following steps:

In a first step, in particular at a first point in time, the clutch is closed with a specific clutch force, in particular a specific clutch torque is realized. As a result of this, the rotational speed of the transmission input shaft is increased in terms of magnitude to the rotational speed of the drive side of the clutch. The rotational speed of the transmission input shaft, in particular at a second point in time, substantially reaches the rotational speed of the drive side of the clutch, in particular while maintaining a minimum slip and/or a stationary differential rotational speed (wherein in the cases mentioned above, the rotational speed of the respective shafts is "substantially" identical, in particular vary by a minimum slip or a specific differential rotational speed).

In a second step, in particular at a third point in time, the synchronization device is actuated, namely an ansynchronization process of a gear stage of the transmission is started with the aid of the synchronization device. Here, the synchronization device is acted upon with a synchronization force which increases in particular continuously.

In the case of a specific first synchronization force which is then determined, in particular at a fourth point in time, the rotational speed of the transmission input shaft breaks away from the rotational speed of the drive side of the clutch. As a result of this, the drag torque of the clutch can then be determined and/or calculated.

In particular at a fifth point in time, if a specific slip and/or a specific rotational speed difference is determined between the transmission input shaft and the drive side of the clutch, the specific second synchronization force which is then present is determined. This second synchronization force is used or called upon to determine the kiss point of the clutch, in particular the corresponding synchronization torque is then initially determined.

In the further method steps, prior to determination and/or adaptation of the kiss point of the clutch, the synchronization device is then firstly moved into its neutral position so that the rotational speed of the transmission input shaft in terms of magnitude approaches the rotational speed of the drive side of the clutch or is brought substantially to the rotational speed of the drive side of the clutch, in particular the rotational speed of the transmission input shaft substantially reaches the rotational speed of the drive side of the clutch at a sixth point in time.

Before the kiss point is determined and/or adapted, the clutch is closed with a maximum clutch pressure, in particular after the fifth point in time and/or after the sixth point in time, in particular, however, after the sixth point in time. The rotational speed of the transmission input shaft has approached the rotational speed of the drive side of the clutch in terms of magnitude in particular between the fifth and the sixth point in time or in particular at the sixth point in time the rotational speed of the transmission input shaft has reached the rotational speed of the drive side of the clutch.

After the clutch has been closed with a maximum clutch force, in particular after the sixth point in time, the synchronization device is closed with the previously determined second synchronization force and after this the clutch pressure is in particular continuously reduced. In particular at a seventh point in time, namely when the second synchronization force or the corresponding synchronization torque exceeds the currently acting clutch pressure in terms of magnitude, the rotational speed of the transmission input shaft breaks away from the rotational speed of the drive side of the clutch. When, in particular at an eighth point in time, a specific slip and/or a specific rotational speed difference between the transmission input shaft and the drive side of the clutch is present, based on this the kiss point of the clutch is determined and/or subsequently adapted.

Key advantages are achieved with the method according to the invention, and the disadvantages described above are avoided.

There are thus a plurality of possibilities of configuring and further developing the method according to the invention in an advantageous manner. For this, reference can initially be made to the dependent claims as well as the description of a preferred exemplary embodiment on the basis of the following description and the drawing.

DETAILED DESCRIPTION OF THE INVENTION

Figure 1:
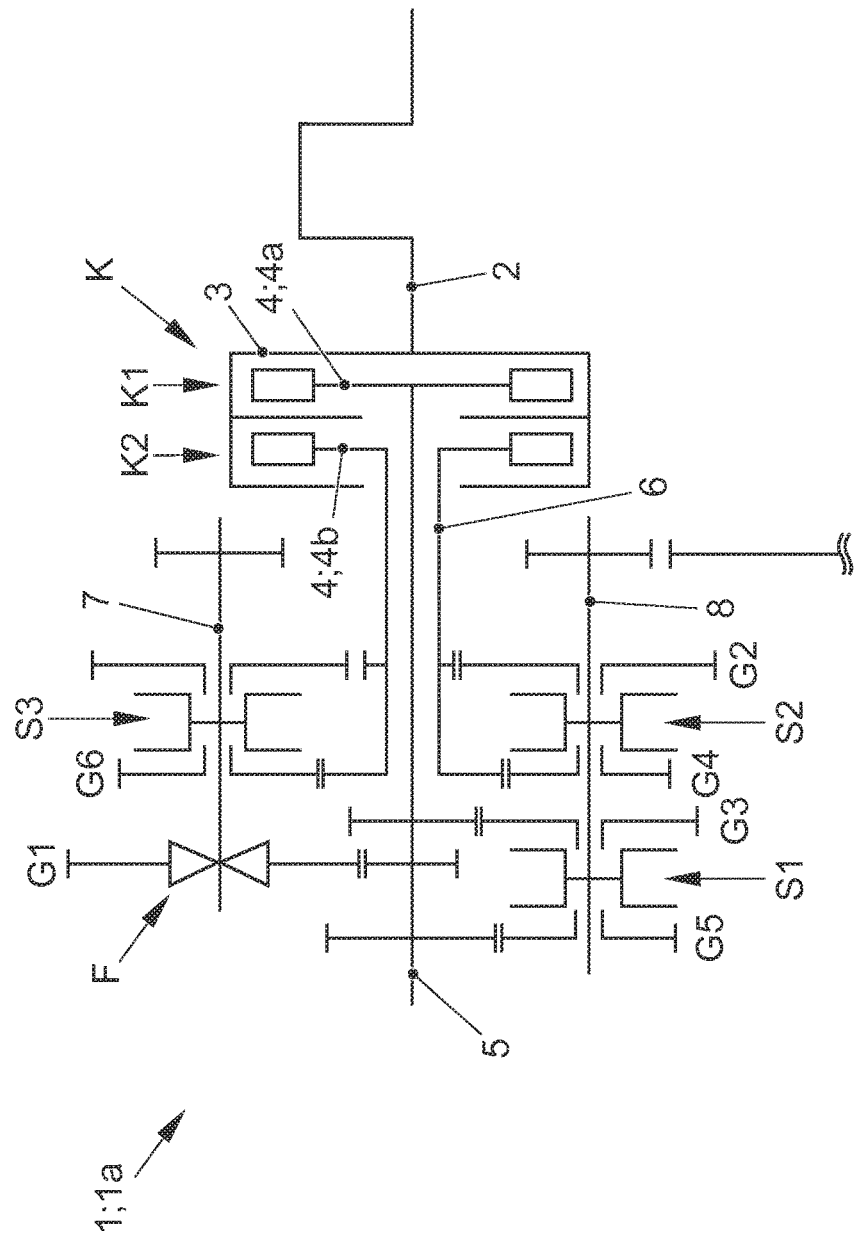
FIG. 1 shows a schematic transmission representation of a dual clutch transmission formed in particular as an automated manual transmission, wherein here the first gear stage is formed as a freewheel-shifted gear stage or the first gear stage has a freewheel.
Figure 2:
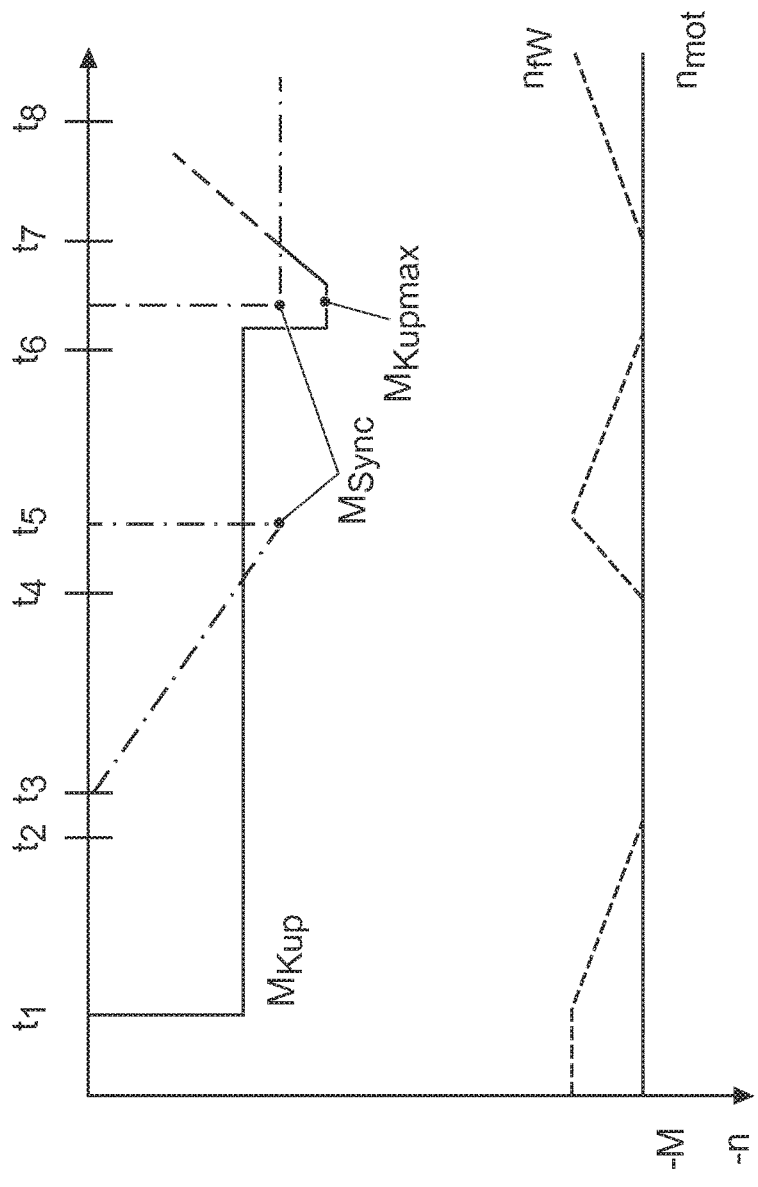
FIG. 2 shows, in a schematic representation, the performance of the method according to the invention with the respective method steps in a schematic graphic representation.

FIGS. 1 to 2 are supposed to illustrate in greater detail a method for determining transmission and/or clutch parameters of an automatic transmission 1 having at least one clutch K, here in particular two clutches K1 or K2, in particular for basic calibration of automatic transmission 1, in particular here of an automated manual transmission which is formed in particular as a dual clutch transmission 1a.

FIG. 1 shows here an automatic transmission 1 which is formed here in particular as an automated manual transmission, here in particular as dual clutch transmission 1a, and has two clutches K1 and K2.

The drag torque and/or the kiss point of a clutch K, here in particular of first clutch K1, is determined with the method described in greater detail here below with the aid of at least one actuable synchronization device S1. Clutch K, here in particular clutches K1 and K2 of the represented dual clutch, have at least one drive side 3 which can be actively connected and/or is actively connected to an internal combustion engine output shaft 2 and at least one output side 4 which is actively connected to a transmission input shaft 5. A K0 clutch actively provided between internal combustion engine output shaft 2 and drive side 3 of clutch K is not explicitly represented here.

In the case of the exemplary embodiment represented here in FIG. 1 of dual clutch transmission 1a represented there, clutch K there is embodied as a dual clutch and has in particular two clutches K1 and K2 embodied as a friction clutch. Dual clutch or clutch K has a drive side 3 and an output side 4 or two output sides 4a and 4b, wherein here in particular an output side 4, namely output side 4a of first clutch K1, is actively connected to transmission input shaft 5. In the closed state of first clutch K1, a corresponding torque can then be transmitted from drive side 3 of the clutch via output side 4, here output side 4a, to transmission input shaft 5.

Transmission input shaft 5 can be referred to as a first transmission input shaft, wherein dual clutch transmission 1a also has a second transmission input shaft 6. At least one transmission output shaft is and/or in the case of the exemplary embodiment represented here in FIG. 1 of dual clutch transmission 1a represented here two drive shafts 7 and 8 are provided which are actively connected to an axle differential not designated in greater detail.

In particular on an EOL test bench, if automatic transmission 1, in particular dual clutch transmission 1a represented here, is "basically calibrated", drive side 3 of clutch K, here in particular first clutch K1, is driven, as already explained above. It should once again be pointed out here that, in the case of automatic transmission 1 represented here, in particular dual clutch transmission 1a represented here, freewheel F is assigned to first gear stage G1, as schematically represented. Dual clutch transmission 1a has here several gear stages G, in particular at least six gear stages G1 to G6, and several synchronization devices S, in particular at least synchronization devices S1 to S3.

The above-mentioned disadvantages are thus initially avoided in that drive side 3 of clutch K, here in particular first clutch K1, is driven with the aid of an electric motor, not represented here, that at least one freewheel-shifted gear stage, in particular first gear stage G1 is freewheel-switched or present and that drive side 3 of the clutch is correspondingly driven by the electric motor in a direction of rotation opposite to the direction of rotation of internal combustion engine output shaft 2. As a result of this, the above-mentioned disadvantages are avoided and corresponding advantages are achieved.

Below, the individual steps of the method according to the invention will be explained again in greater detail on the basis of FIG. 2. It should first, however, generally be pointed out that FIG. 2—from the representation—shows negative torques and/or rotational speeds since, according to the invention, the rotation of drive side 3 of clutch K and thus also the rotation of transmission input shaft 5 in an opposite direction of rotation to the—conventional—direction of rotation of internal combustion engine output shaft 2 should represent. The torques and rotational speeds represented there on the y-axis have therefore been provided with a minus sign (−). Reference is, however, made in the following description partially to the values/points/profiles represented in FIG. 2 "in a magnitude-based manner", wherein this can also be referred to at this point.

FIG. 2 shows that, in a first step, in particular at a first point in time $t_1$, clutch K, here first clutch K1, is closed with a specific clutch force $M_{kup}$, in particular a specific clutch torque is realized. Rotational speed $n_{fw}$ of the freewheeling transmission input shaft, here first transmission input shaft 5, is increased thereafter in terms of magnitude to rotational speed $n_{mot}$ of drive side 3 of the clutch, here first clutch K1, as is apparent in FIG. 2 from the dashed ramp-shaped representation between points in time $t_1$ and $t_2$. It is initially assumed here that rotational speed $n_{mot}$ of drive side 3 of the clutch substantially corresponds to the rotational speed of electric motor ($n_{mot}$). In particular at a second point in time $t_2$, rotational speed $n_{fw}$ of the transmission input shaft, here first transmission input shaft 5, then reaches rotational speed $n_{mot}$ of drive side 3 of clutch K. The term "substantially" means in particular that the approximation of the rotational speeds is realized in particular while maintaining a minimum slip and/or a stationary differential rotational speed.

In a second step, in particular at a third point in time $t_3$, synchronization device S is actuated, here in particular synchronization device S1 from FIG. 1, namely an ansynchronization process of a gear stage of the transmission assigned to freewheeling transmission input shaft 5, for example, third gear stage G3, is started with the aid of the synchronization device and synchronization device S1 is acted upon with a synchronization force which increases in particular continuously. This is the case or correspondingly represented in FIG. 2 between the third point in time $t_3$ and a fifth point in time $t_5$.

As is apparent from FIG. 2, in particular at a fourth point in time $t_4$, rotational speed $n_{fw}$ of transmission input shaft 5 breaks away from rotational speed $n_{mot}$ of drive side 3 of clutch K, wherein the first synchronization force which is then present here is determined and/or identified and as a result of this the drag torque of the clutch can then be determined and/or calculated.

As FIG. 2 shows, in particular at a fifth point in time $t_5$, a second specific synchronization force which is then present is determined if a specific slip and/or a specific rotational speed difference is determined between the transmission input shaft, here first transmission input shaft 5, and drive side 3 of clutch K, here first clutch K1. This second synchronization force is used or called upon to determine the kiss point of the clutch, here first clutch K1, in particular a corresponding synchronization torque $M_{Sync}$ is then initially determined.

Before the kiss point of the clutch, here first clutch K1, is determined and/or adapted, actuated synchronization device S1 is initially moved into its neutral position, in particular after fifth point in time $t_5$. As a result of this, rotational speed $n_{fW}$ of transmission input shaft 5 in terms of magnitude approaches rotational speed $n_{mot}$ of drive side 3 of clutch K, here clutch K1, or is brought substantially to rotational speed $n_{mot}$ of drive side 3 of clutch K, here first clutch K1. In particular at a sixth point in time $t_6$, rotational speed $n_{fW}$ of transmission input shaft 5 reaches rotational speed $n_{mot}$ of drive side 3 of clutch K, as represented in FIG. 2.

It is furthermore apparent from FIG. 2 that clutch K, here first clutch K1, is closed with a maximum clutch pressure $M_{kupmax}$, in particular, however, after the fifth point in time $t_5$ and/or after the sixth point in time $t_6$, in particular, however, only after the sixth point in time $t_6$. The rotational speed $n_{fW}$ of transmission input shaft 5 has, in the case of the exemplary embodiment represented in FIG. 2, already approached rotational speed $n_{mot}$ of drive side 3 of clutch K, here first clutch K1, or rotational speed $n_{fW}$ of transmission input shaft 5 has already reached rotational speed $n_{mot}$ of drive side 3 of clutch K if clutch K, here first clutch K1, is closed with maximum clutch pressure $M_{kupmax}$.

In a further step, in particular after the application of maximum clutch pressure $M_{kupmax}$, synchronization device S1 is closed with the previously determined second synchronization force or corresponding synchronization torque $M_{Sync}$ is applied. This is the case or correspondingly represented in FIG. 2 in particular between point in time $t_6$ and seventh point in time $t_7$. After this, the clutch pressure is in particular continuously reduced starting from clutch pressure $M_{kupmax}$. In particular at a seventh point in time $t_7$, in particular when the second synchronization force or synchronization torque $M_{Sync}$ exceeds the currently acting clutch pressure in terms of magnitude, rotational speed $n_{fW}$ of transmission input shaft 5 breaks away from rotational speed $n_{mot}$ of drive side 3 of clutch K, here first clutch K1. This is clearly represented in FIG. 2.

In particular when, in particular at an eighth point in time $t_8$, a specific slip and/or a specific rotational speed difference between transmission input shaft 5 and drive side 3 of clutch K is present, based on this the kiss point of the clutch is determined and/or this is correspondingly adapted afterwards, in particular later when the method is ongoing.

As already mentioned above, automatic transmission 1 is formed in particular as a dual clutch transmission 1a, but other forms of automatic transmissions are also conceivable. The known further components such as a control unit, rotational speed sensors for identifying, measuring the respective current rotational speeds or the like, are correspondingly provided or present.

The drivetrain of the motor vehicle can be formed as a hybrid drivetrain and therefore have at least one electric motor. In this case, precisely this electric motor of the hybrid drivetrain can also drive drive side 3 of clutch K, here in particular first clutch K1, where desired.

It is, however, also conceivable that the drive side of the clutch is driven by an external electric motor, in particular by an electric motor which is present on the EOL test bench.

LIST OF REFERENCE NUMBERS

1 Automatic transmission
1a Dual clutch transmission
2 Internal combustion engine output shaft
3 Drive side
4 Output side
4a, 4b Output side of clutch K1/K2
5 First transmission input shaft
6 Second transmission input shaft
7 Drive shaft
8 Drive shaft
MSync Synchronization torque
$M_{kup}$ Clutch force/clutch torque
$M_{kupmax}$ Maximum clutch force/maximum clutch torque
K, K1, K2 Clutch, first or second clutch
S, S1 to S3 Synchronization devices
F Freewheel
t1 to t8 First to eighth point in time
G, G1 to G6 Gear stages/gears
nfW Rotational speed of the transmission input shaft
nmot Rotational speed of the drive side of the clutch

The invention claimed is:

1. A method for determining at least one of transmission or clutch parameters of a motor vehicle automatic transmission having at least one clutch or an automated manual transmission or a dual clutch transmission, for basic calibration of the automatic transmission, the method comprising the following steps:
   determining at least one of a drag torque or a kiss point of the at least one clutch by using at least one actuable synchronization device;
   providing the at least one clutch with a drive side being actively connected to or configured to be actively connected to an internal combustion engine output shaft and providing the at least one clutch with an output side being actively connected to at least one transmission input shaft;
   blocking at least one of the internal combustion engine output shaft or the transmission input shaft;
   driving the drive side of the at least one clutch by using an electric motor;
   providing at least one freewheel-shifted gear stage; and
   driving the drive side of the at least one clutch in a direction of rotation of the electric motor being opposite to a direction of rotation of the internal combustion engine output shaft.

2. The method according to claim 1, which further comprises in a first step or at a first point in time, closing the at least one clutch with a specific clutch force or realizing a specific clutch torque, and then increasing the rotational speed of the transmission input shaft in terms of magnitude to the rotational speed of the drive side of the at least one clutch or the rotational speed of the transmission input shaft or at a second point in time substantially reaching the rotational speed of the drive side of the at least one clutch or while maintaining a minimum slip or a stationary differential rotational speed.

3. The method according to claim 2, which further comprises in a second step or at a third point in time, actuating the synchronization device or starting an ansynchronization process of a gear stage of the transmission by using the synchronization device and acting upon the synchronization device with a synchronization force increasing continuously.

4. The method according to claim 3, which further comprises at a specific determined first synchronization force or at a fourth point in time, breaking the rotational speed of the transmission input shaft away from the rotational speed of the drive side of the at least one clutch, resulting in the drag torque of the at least one clutch then being determined or calculated.

5. The method according to claim 4, which further comprises upon determination of a specific slip or a specific rotational speed difference between the transmission input shaft and the drive side of the at least one clutch or at a fifth point in time, determining and using or calling upon the specific second synchronization force when present to determine the kiss point of the at least one clutch or then determining the synchronization torque existing at the fifth point in time.

6. The method according to claim 5, which further comprises moving the synchronization device into a neutral position so that the rotational speed of the transmission input shaft in terms of magnitude approaches the rotational speed of the drive side of the at least one clutch or is brought substantially to the rotational speed of the drive side of the at least one clutch or substantially reaches the rotational speed of the drive side of the at least one clutch, at a sixth point in time.

7. The method according to claim 6, which further comprises closing the at least one clutch with a maximum clutch pressure or after the fifth point in time or after the sixth point in time, and the rotational speed of the transmission input shaft approaches the rotational speed of the drive side of the at least one clutch or is brought substantially to the rotational speed of the drive side of the at least one clutch or has already substantially reached the rotational speed of the drive side of the at least one clutch, at the sixth point in time.

8. The method according to claim 6, which further comprises closing the synchronization device with the previously determined second synchronization force after an application of the maximum clutch pressure, and then continuously reducing the clutch pressure and, at a seventh point in time, when the second synchronization force exceeds the currently acting clutch pressure in terms of magnitude, breaking the rotational speed of the transmission input shaft away from the rotational speed of the drive side of the at least one clutch, and then determining the kiss point of the at least one clutch when, at an eighth point in time, a specific slip or a specific rotational speed difference exists between the transmission input shaft and the drive side of the at least one clutch.

9. The method according to claim 1, which further comprises forming the automatic transmission as a dual clutch transmission or forming the drivetrain of the motor vehicle as a hybrid drivetrain with at least one electric motor driving the drive side of the at least one clutch.

10. The method according to claim 1, which further comprises driving the drive side of the at least one clutch by using an external electric motor.

* * * * *